United States Patent [19]

Hidaka et al.

[11] Patent Number: 5,237,319

[45] Date of Patent: Aug. 17, 1993

[54] REMOTE CONTROL DEVICE WITH LEARNING FUNCTION

[75] Inventors: Hidenori Hidaka; Sachiko Miyashita, both of Tokyo, Japan

[73] Assignee: Pioneer Electronic Corporation, Tokyo, Japan

[21] Appl. No.: 753,001

[22] Filed: Aug. 19, 1991

Related U.S. Application Data

[63] Continuation of Ser. No. 503,088, Apr. 2, 1990, abandoned, which is a continuation of Ser. No. 197,252, May 23, 1988, abandoned.

[30] Foreign Application Priority Data

May 22, 1987 [JP] Japan .................. 62-123933

[51] Int. Cl.[5] ............................................. G08C 19/00
[52] U.S. Cl. ........................ 340/825.72; 340/825.69; 358/194.1
[58] Field of Search ............... 340/825.69, 825.72; 358/194.1; 455/352, 151.1, 151.2, 151.4; 359/142, 146, 148

[56] References Cited

U.S. PATENT DOCUMENTS

| | | | |
|---|---|---|---|
| 4,482,947 | 11/1984 | Zato et al. | 358/194.1 |
| 4,519,002 | 5/1985 | Amano | 358/194.1 |
| 4,623,887 | 11/1986 | Welles, II | 340/825.69 |
| 4,703,359 | 10/1987 | Rumbolt | 455/603 |
| 4,718,112 | 1/1988 | Shinoda | 358/194.1 |
| 4,746,919 | 5/1988 | Reitmeier | 340/825.69 |
| 4,769,643 | 9/1988 | Sogame | 455/603 |
| 4,774,511 | 9/1988 | Rumbolt et al. | 358/194.1 |
| 4,825,200 | 4/1989 | Evans et al. | 455/151 |
| 4,855,730 | 8/1989 | Venners et al. | 358/194.1 |
| 4,855,746 | 8/1989 | Stacy | 358/194.1 |

OTHER PUBLICATIONS

Mr. Hiroshi Koinuma, "What is a Learning Remote Control?", Mar. 1988 Electronics.

Primary Examiner—Donald J. Yusko
Assistant Examiner—Michael Horabik
Attorney, Agent, or Firm—Sughrue, Mion, Zinn, Macpeak & Seas

[57] ABSTRACT

A remote control device having a learning function includes a manipulating section having a plurality of control keys; a first read only memory having storage portions which correspond to the keys and store informations for remote control signals in advance; a reception section for receiving a remote control signal; a mode changeover section for shifting the operation mode of the device between a reception mode and a transmission mode; an erasable second memory which has storage portions corresponding to the control keys of the manipulating section; a writing section for writing the information of the remote control signal received by the reception section into the storage portion of the second memory corresponding to the manipulated control key of the manipulating section when the operation mode is shifted to the reception mode; a reading section for reading the information stored in the storage portions of the first and second memory, which correspond to the manipulated control key of the manipulating section, in response to the manipulation of the key when the operation mode is shifted to the transmission mode; and a transmission section for transmitting the remote control signals formed from the information read by the reading section.

4 Claims, 2 Drawing Sheets

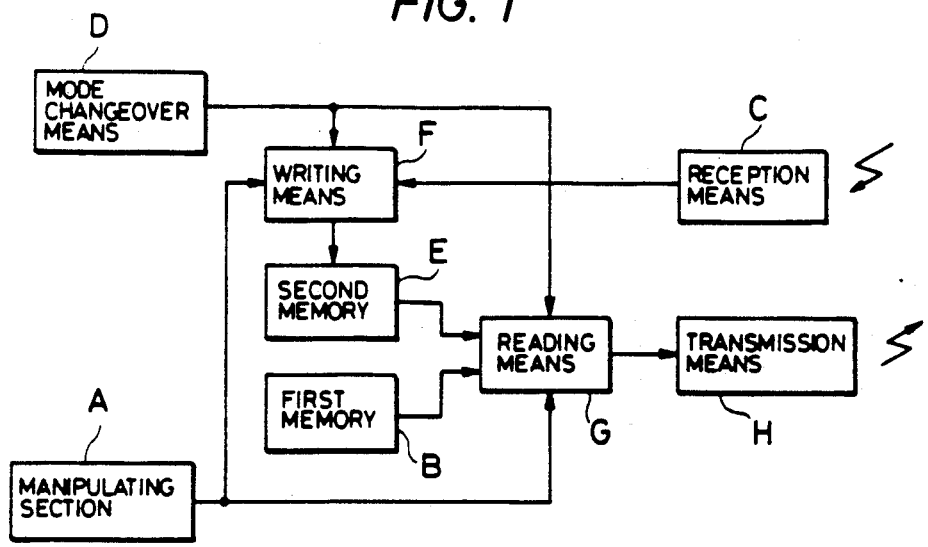
FIG. 1
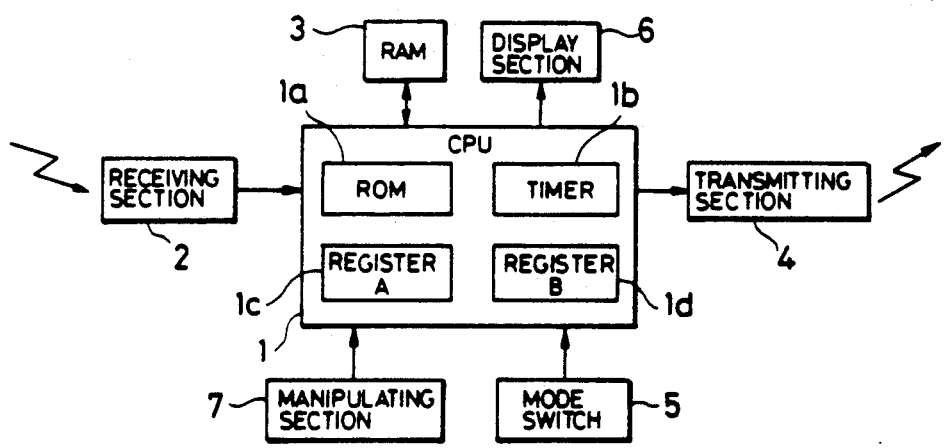
FIG. 2
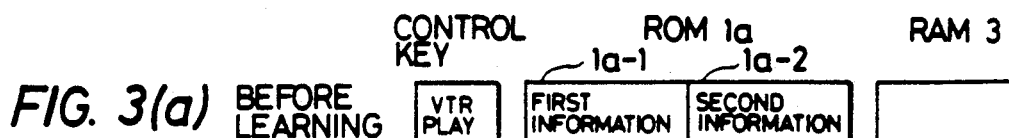
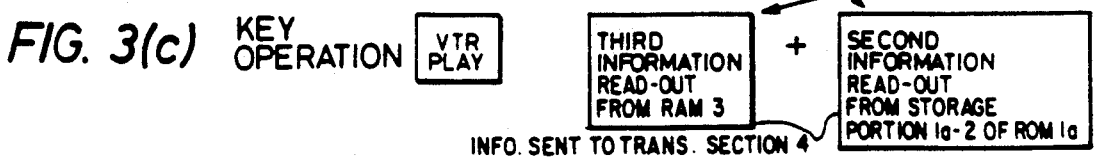

REMOTE CONTROL DEVICE WITH LEARNING FUNCTION

This is a continuation of application Ser. No. 07/503,088 filed Apr. 2, 1990, now abandoned, which is a continuation of application Ser. No. 07/197,252 filed May 23, 1988, now abandoned.

BACKGROUND OF THE INVENTION

The present invention relates to a remote control device, particularly to a remote control device which has a learning function in which a remote control signal transmitted from another remote control device is received to perform learning and to transmit a new remote control signal on the basis of the learning.

An audio-visual system comprises a video cassette recorder and an audio machine which is composed of an amplifier and a source unit such as a tuner, an audio tape recorder and a record player. Usually, the video cassette recorder and the audio machine are sold separately from each other, and remote control devices are attached to them, respectively. For that reason, when the video cassette recorder is to be run for playback, it is necessary to not only place the video cassette recorder into playback action by the remote control device therefor but also to perform the mode selecting manipulation of the amplifier of the audio machine by the remote control device therefor. Therefore, the audio-visual system has a drawback in that it is troublesome to manipulate it.

In order to eliminate the above-mentioned drawback, a remote control device having a learning function, which is performed through the use of additional keys and additional storage regions corresponding to the additional keys and in which a remote control signal is received from another remote control device, the information of the remote control signal is stored in the additional storage region and another remote control signal based on the stored information is transmitted by manipulating the additional key, was proposed. Since the key manipulation of the remote control device having the learning function can be made equivalent to that of a plurality of remote control devices having no learning function, it is more convenient to use the remote control device having the learning function than to use the remote control devices having no learning function. However, since it is necessary that the key manipulation of the remote control device having the learning function is performed twice for newly-memorized video cassette recorder playback and amplifier mode selection, the remote control device has a disadvantage in that the manipulating property thereof is not good.

SUMMARY OF THE INVENTION

The present invention was made in order to eliminate the above-mentioned drawback and disadvantage.

Accordingly, it is an object of the present invention to provide a remote control device having a learning function in which the information of a remote control signal received from another remote control device is stored, the stored information and originally stored information are combined with each other to generate another remote control signal, and the latter remote control signal is transmitted, thereby improving the manipulating property of the remote control device having the learning function.

As shown in FIG. 1, the remote control device having the learning function basically comprises a manipulating section A having a plurality of control keys; a first memory means B which is a read-only memory means and has storage portions which correspond to the control keys of the manipulating section and in which information for making a remote control signal is stored beforehand; a reception means C for receiving a remote control signal from the outside of the remote control device; a mode changeover means D for shifting the operation mode of the remote control device for reception or transmission; a second memory means E which is rewritable and has storage portions corresponding to the same control keys of the manipulating section as the storage portions of the first memory means do; a writing means F for writing the information of the remote control signal received by the reception means, into the storage portion of the second memory means, which corresponds to the manipulated control key of the manipulation section; a reading means G for reading the information stored in the storage portions of the first and the second memory means, which correspond to the manipulated control key of the manipulating section; and a transmission means H for transmitting the remote control signal made from the information read by the reading means. Thus, the information of the remote control signal received from the outside of the remote control device having the learning function is stored in the second storage means E so that the information stored therein can be transmitted together with the information stored in the corresponding storage portion of the first memory means B, in response to the manipulation of the control key of the manipulating section A. Since the information stored before learning and the information stored after the learning can be serially transmitted based on the read information in a pair (i.e., two remote control signals are transmitted) by manipulating the control key only once, the manipulating property of the remote control device having the learning function is improved so that the operation mode of an audio-visual system can be automatically shifted, through simple manipulation, on the basis of the learned information of the remote control signal received from the outside of the remote control device.

BRIEF DESCRIPTION OF THE DRAWINGS

FIG. 1 shows a block diagram of the basic constitution of a remote control device having a learning function, which is provided in accordance with the present invention;

FIG. 2 shows a block diagram of a remote control device which has a learning function and is an embodiment of the present invention;

FIGS. 3a, 3b, and 3c show a diagram for describing the outline of the operation of the remote control device shown in FIG. 2.

DETAILED DESCRIPTION OF EXEMPLARY EMBODIMENT

Figure 4:
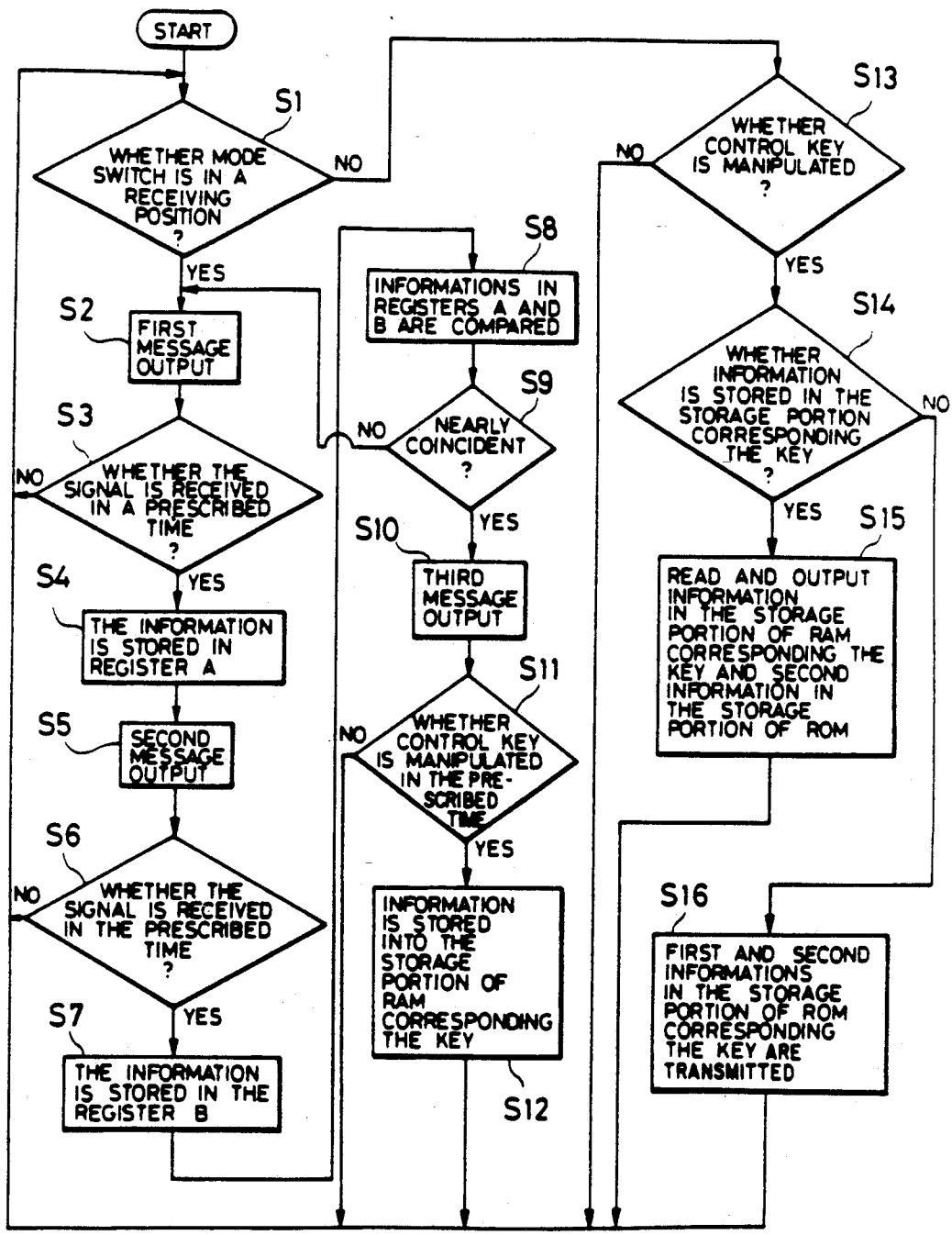
FIG. 4 shows a flow chart of the operation of the microcomputer of the remote control device shown in FIG. 2.

An embodiment of the present invention, which is a remote control device having a learning function, will be hereafter described in detail with reference to FIGS. 2, 3 and 4.

As shown in FIG. 2, the remote control device having the learning function includes a microcomputer 1 which operates according to a prescribed control program as shown in a flow chart in FIG. 4 and has a read-only memory (hereinafter referred to as ROM) 1a, a timer 1b, a register A 1c and a register B 1d. The remote control device also includes a receiving section 2 for receiving a remote control signal from another remote control device not shown in the drawings, a random access memory (hereinafter referred to as RAM) 3 into and from which information is written and read by the microcomputer 1, a transmitting section 4 for transmitting a remote control signal generated on the basis of information sent out from the microcomputer, a mode switch 5 for shifting the operation mode of the remote control device for reception or transmission, a display section 6 for indicating the sequence of the operation of the remote control device, and a manipulating section 7 having a plurality of control keys.

The control keys include a video cassette recorder playback key, for example. Each of the ROM 1a and the RAM 3 has storage portions corresponding to the control keys. The storage portion of the ROM 1a, which corresponds to the video cassette recorder playback key, is divided into a first storage region 1a-1 and a second storage region 1a-2, for example. Playback code information for making a remote control signal for starting the playback of a video cassette recorder manufactured by a company A, for example, is stored as first information in the first storage region 1a. Mode code information for making a remote control signal for shifting the operation mode of the amplifier of an audio machine manufactured by the company A, for video cassette recorder playback or auxiliary operation, is stored as second information in the second storage region 1a-2.

No information is stored in the storage portions of the RAM 3 at first. When the mode switch 5 is shifted for the reception and the remote control signal from the other remote control device not shown in the drawings is received by the receiving section 2, the information of the received remote control signal is stored as third information in the storage portion of the RAM 3 through the manipulation of the corresponding control key of the manipulating section 7 as shown in FIG. 3(b). Thus, the remote control device which is the embodiment can perform such learning that a remote control signal generated through the manipulation of the playback key of a remote control device for a video cassette recorder manufactured by another company B is received by the receiving section 2 and the information of the received remote control signal is stored as the third information in the corresponding storage portion of the RAM 3 through the manipulation of the video cassette recorder playback key of the remote control device which is the embodiment.

When the video cassette recorder playback key of the manipulating section 7 is manipulated as the mode switch 5 is in a transmitting position and the learning is not yet performed, the first information and the second information are read from the storage portion of the ROM 1a, which corresponds to the video cassette recorder playback key of the manipulating section 7, and the remote control signals based on the first information and the second information are transmitted, so that the start of playback of the video cassette recorder and the shifting of the operation mode of the amplifier of the audio machine for video cassette recorder playback can be performed through the signal key manipulation if the video cassette recorder is the one manufactured by the company A.

FIG. 3C shows the operation of the remote control device when the video cassette recorder playback key of the manipulating section 7 is manipulated as the mode switch 5 is in the transmitting position and the learning is already performed. As shown in FIG. 3(c) the third information is read from the storage portion of the RAM 3, which corresponds to the video cassette recorder playback key of the manipulating section 7, and the second information is read from the second storage region 1a-2 of the storage portion of the ROM 1a, which corresponds to the video cassette recorder playback key of the manipulating section. Accordingly a remote control signal based on the third information and the remote control signal based on the second information are transmitted, so that the playback of the video cassette recorder manufactured by the company B can be started and the operation mode of the amplifier of the audio machine manufactured by the other company A can be shifted for the video cassette recorder playback, through the single key manipulation.

The operation of the remote control device, which is briefly described above, is described in detail from now on with reference to the flow chart in FIG. 4 showing the operation of the microcomputer 1.

When electric power is applied to the remote control device, the microcomputer 1 starts operating. In a step S1 shown in the flow chart, it is judged whether or not the mode switch 5 is in a receiving position. When it is judged in the step S1 that the mode switch 5 is in the receiving position, first message information stored in the ROM 1a, for example, is read therefrom and sent out to the display section 6 to make an indication to urge the manipulation of a key of the other remote control device in a step S2.

In a step S3, it is judged, by monitoring the output from the receiving section 2 for a prescribed time measured by the timer 1b, whether or not the remote control signal from the other remote control device is received by the remote control device as the embodiment in the prescribed time. When it is judged in the step S3 that the key of the other remote control device is not manipulated and the remote control signal from the other remote control device is therefore not received by the remote control device as the embodiment, the step S1 is taken again. When it is judged in the step S3 that the remote control signal from the other remote control device is received by the remote control device as the embodiment as a result of the manipulation of the key of the other remote control device, the received remote control signal is analyzed and the information thereof is stored in the register A 1c in a step S4.

In a step S5, second message information stored in the ROM 1a, for example, is read therefrom and sent out to the display section 6 to make an indication to urge the re-manipulation of the same key of the other remote control device.

In a step S6, it is judged whether or not the remote control signal is received by the remote control device as the embodiment in the prescribed time, as in the step S3. When it is judged in the step S6 that the remote control signal is not received by the remote control device as the embodiment, the step S1 is taken again. When it is judged in the step S6 that the remote control signal is received by the remote control device as the embodiment, the received remote control signal is analyzed and the information thereof is stored in the register B 1d in a step S7. In a step S8, the information stored in the register A 1c and that stored in the other register B 1d are compared with each other. In a step S9, it is judged whether or not the information stored in the register A 1c and that stored in the other register B 1d are nearly coincident (approximately the same) with each other. The steps S5, S6, S7, S8 and S9 are for preventing the learning of the information of a remote control signal received mistakenly by the remote control device which is the embodiment.

When it is judged in the step S9 that the information stored in the register A 1c and that stored in the other register B 1d are not nearly coincident with each other, the step S2 is taken again. When it is judged in the step S9 that the information stored in the register A 1c and that stored in the other register B 1d are nearly coincident with each other, the remote control signal is regarded as properly received by the remote control device as the embodiment, so that third message information stored in the ROM 1a, for example, is read therefrom and sent out to the display section 6 to make an indication to urge the display section to indicate which control key of the manipulating section 7 to manipulate to store the information of the received remote control signal into the RAM 3, in a step S10.

In a step S11, it is judged, by monitoring the output from the manipulating section 7 for a prescribed time measured by the timer 1b, whether or not the control key of the manipulating section 7 is manipulated in the prescribed time. When it is judged in the step S11 that the control key of the manipulating section 7 is not manipulated in the prescribed time, the step S1 is taken again. When it is judged in the step S11 that the control key of the manipulating section 7 is manipulated in the prescribed time, the information stored in the register A 1c or the other register B 1d is stored into the storage portion of the RAM 3, which corresponds to the manipulated control key of the manipulating section 7, in a step S12. After that, the step S1 is taken again.

When it is judged in the step S1 that the mode switch 5 is not in the receiving position but in the transmitting position, it is judged in a step S13 whether or not a control key of the manipulating section 7 is manipulated. When it is judged in the step S13 that the control key of the manipulating section 7 is not manipulated, the step S1 is taken again. When it is judged in the step S13 that the control key of the manipulating section 7 is manipulated, it is judged in a step S14 whether or not information is stored in the storage portion of the RAM 3, which corresponds to the manipulated control key.

When it is judged in the step S14 that the information is stored in the storage portion of the RAM 3, which corresponds to the manipulated control key, the third information stored in the storage portion of the RAM 3, which corresponds to the manipulated control key, and the second information stored in the second storage region 1a-2 of the storage portion of the ROM 1a, which corresponds to the manipulated control key, are read therefrom and sent out to the transmitting section 4 so that the remote control signals based on the third information and the second information are transmitted, in a step S15. When it is judged in the step S14 that the information is not stored in the storage portion of the RAM 3, which corresponds to the manipulated control key, the first information and the second information stored in the storage portion of the ROM 1a, which corresponds to the manipulated control key, are read from the storage portion and sent out to the transmitting section 4 so that the remote control signals based on the first information and the second information are transmitted, in a step S16.

Although the second information which is stored in the particular storage portion of the ROM 1a is made of a signal code in the above-described embodiment, the present invention is not confined thereto but may be otherwise embodied so that the second information is made of a plurality of codes. The same thing applies to the information which is stored in the storage portion of the RAM 3.

Although the information stored in the storage portion of the RAM 3 is read therefrom but the first information stored in the first storage region of the corresponding storage portion of the ROM 1a is not read therefrom as the former is already stored in the storage portion of the RAM, in the above-described embodiment, the present invention is not confined thereto but may be otherwise embodied so that a selection switch for selecting which information to read is provided.

Although only one of the pieces of information stored in the ROM 1a is always read therefrom in the above-described embodiment, the present invention is not confined thereto but may be otherwise embodied so that a selection switch for selecting which piece of information read is provided.

What is claimed is:

1. In a learning remote control device comprising a manipulating section having a plurality of control keys, a first memory means having storage portions which correspond to said control keys, a reception means for receiving a remote control signal from the outside of said device, and a mode changeover means for shifting the operation mode of said device between a reception mode and a transmission mode, the improvement comprising:

an erasable second memory means which has storage portions corresponding to said control keys of said manipulating section, said control keys being the same as those corresponding to said storage portions of said first memory means;

a writing means, operable when said operation mode is shifted to said reception mode by said changeover means, for writing the information of said remote control signal received by said reception means into the storage portion of said second memory means, said written information being stored in a storage portion of said second memory means which corresponds to a manipulated one of said control keys of said manipulating section;

a reading means, operable when said operation mode is shifted to said transmission mode by said mode changeover means and the one of said control keys is manipulated, for reading the information stored in those storage portions of said first and second memory means which correspond to the manipulated one of said control keys of said manipulating section; and a transmission means for transmitting the remote control signals respectively corresponding to said information read from said first and second memory means by said reading means and wherein said first memory means is a read-only type memory which stores predetermined information representing remote control signals for operating a first appliance, and wherein said second memory means stores information representing received remote control signals for operating a second appliance which is different from the first appliance.

2. The remote control device of claim 1, wherein said first memory means comprises a ROM, and said erasable second memory means comprises a RAM.

3. The remote control device of claim 1, further comprising display means for prompting a user after a remote control signal is received by said reception means and stored in said erasable second memory means by said writing means.

4. A learning remote control device comprising a manipulating section having a plurality of control keys, a first memory means having storage portions corresponding to said plurality of control keys, respectively, reception means for receiving a remote control signal, and a mode changeover means for shifting the operation mode of said device between a reception mode and a transmission mode, the improvement comprising:

- a second memory means having storage portions corresponding to said plurality of control keys, respectively, so that the storage portions of said memory means correspond respectively to the storage portions of said first memory means;
- a writing means, coupled to receive an output of said reception means, for writing information representing the received remote control signal into a storage portion of said second memory means which corresponds to the manipulated control key of said manipulating section when said operation mode is shifted to said reception mode by said mode changeover means;
- reading means, coupled to receive an output of said first and second memory means, for reading the information stored in the storage portions of said first and second memory means, the storage portions of the read information corresponding to the manipulated control key of said manipulating section, said reading means only being operable when the operation mode of the device is switched to the transmission mode by said mode changeover means; and
- transmission means, coupled to receive an output of said reading means, for transmitting the remote control signals corresponding to said information read by said reading means, and wherein said first memory means is a read-only type memory which stores predetermined information representing remote control signals for operation a first appliance, and wherein said second memory means stores information representing received remote control signals for operating a second appliance which is different from the first appliance, whereby a manipulation of a single control key, during the transmission mode of operation by the device causes the read remote control signals from the first and second memory means to be transmitted by said transmission means.

* * * * *